US006830803B2

(12) United States Patent
Vaidya et al.

(10) Patent No.: US 6,830,803 B2
(45) Date of Patent: Dec. 14, 2004

(54) PRINTED SUBSTRATE MADE BY TRANSFER OF INK JET PRINTED IMAGE FROM A PRINTABLE TRANSFER FILM

(75) Inventors: Utpal Vaidya, Eden Prairie, MN (US); Felix P. Shvartsman, Eden Prairie, MN (US); Roman T. Knipp, Stillwater, MN (US)

(73) Assignee: DataCard Corporation, Minnetonka, MN (US)

( * ) Notice: Subject to any disclaimer, the term of this patent is extended or adjusted under 35 U.S.C. 154(b) by 0 days.

(21) Appl. No.: 09/738,408

(22) Filed: Dec. 15, 2000

(65) Prior Publication Data

US 2002/0012773 A1 Jan. 31, 2002

Related U.S. Application Data

(60) Provisional application No. 60/171,040, filed on Dec. 16, 1999.

(51) Int. Cl.[7] ......................... B32B 17/10; B32B 27/00; B32B 27/36; B29D 22/00; B41M 3/12

(52) U.S. Cl. ................ 428/195.1; 428/35.9; 428/36.91; 428/412; 428/423.7; 428/435; 428/914

(58) Field of Search ............................ 428/35.9, 36.91, 428/195.1, 412, 423.7, 435, 914, 195, 211, 346, 913

(56) References Cited

U.S. PATENT DOCUMENTS 4,408,557 A * 10/1983 Bradley et al. ............. 116/206
5,098,772 A 3/1992 af Strom
5,104,730 A 4/1992 Misuda et al.
5,264,275 A 11/1993 Misuda et al.
5,463,178 A 10/1995 Suzuki et al.
5,672,413 A 9/1997 Taylor et al.
5,700,582 A 12/1997 Sargeant et al.
5,795,425 A 8/1998 Brault et al.
5,853,899 A 12/1998 Anderson et al.
5,948,586 A 9/1999 Hare
6,043,192 A * 3/2000 Fukumuro et al. .......... 428/195
6,089,704 A * 7/2000 Burns et al. ............. 428/32.23

FOREIGN PATENT DOCUMENTS

EP 0 805 049 A1 11/1997
EP 0 820 874 A1 1/1998
EP 0 933 225 A1 8/1999
EP 0 933 226 A2 8/1999

* cited by examiner

*Primary Examiner*—B. Hamilton Hess
*Assistant Examiner*—L. Ferguson
(74) *Attorney, Agent, or Firm*—Merchant & Gould P.C.

(57) ABSTRACT

The disclosure provides a method for printing an image on a substrate. An image is printed onto a carrier substrate that has been coated with a receptive layer having at least two layers: a transferable skin layer and an absorptive layer. The image is then transferred to a final substrate using heat and pressure.

53 Claims, 5 Drawing Sheets

(A)

(B)

(C)

(A)

(B)

(C)

(A)

(B)

(C)

PRINTED SUBSTRATE MADE BY TRANSFER OF INK JET PRINTED IMAGE FROM A PRINTABLE TRANSFER FILM

CROSS-REFERENCE TO RELATED APPLICATIONS

This application claims priority to U.S. Provisional Application Ser. No. 60/171,040, filed Dec. 16, 1999, entitled PRINTED SUBSTRATE MADE BY TRANSFER OF INK JET PRINTED IMAGE FROM A PRINTALBE TRANSFER FILM, the disclosure of which is hereby incorporated herein in its entirety.

BACKGROUND

Digital printing has revolutionized the printing industry. The ease of printing variable images, making reprints, archiving images, and printing on demand are some of the key advantages of digital printing.

Ink jet printing is one of the cheapest and most convenient technologies available for digital printing. Ink jet printers form an image by delivering small droplets of liquid ink through an ink delivery head. The ink generally contains either soluble dyes or insoluble pigments as colorants, and a solvent. Many commonly used inks contain water as a component. Other inks contain volatile organic solvents. Still other inks contain UV curable monomers.

The speed of solvent removal from a printed surface can affect the quality of the resultant image. Slow-drying ink can lead to coalescence of printed ink droplets, which may negatively affect print quality. The speed of solvent removal is affected by the amount and type of solvent in the ink and the absorptiveness of the printed surface. Generally, an absorptive surface enhances solvent removal.

Generally, inks that contain volatile organic solvents dry more quickly than water-based inks. However, inks containing volatile organic solvents may pose health and safety hazards. Therefore, such inks are generally not suitable for use in an office environment. Instead, organic solvent or monomer-based inks are typically used in an industrial environment using proper handling and safety measures. Water-based inks are preferred for use in office environments.

Plastic cards are increasingly being used as data carrying devices, for example, for identification and electronic transactions. Common examples of such data carrying devices are credit cards, ATM cards, ID cards, badges, membership cards, access cards etc. . . . Advanced electronic technologies are making these cards increasingly valuable and sophisticated. Besides incorporating data in the cards, the cards are used as billboards to advertise the business of the issuer. Additionally, the cards are frequently personalized to include unique information about the card user. It is desirable to produce such cards with high quality print and high durability.

A majority of card personalization and issuance is performed in an office environment. Typically, a non-porous plastic card surface is personalized by thermal transfer printing.

Ink jet printing provides a flexible and economically attractive option for card printing. Attempts have been made to print an image on the non-porous plastic surface of a card using a water-based ink and a coating that provides an absorptive layer. Although an acceptable print quality can be achieved using this method, the absorptive layer tends to continue absorbing moisture over the life of the card and may adversely affect card durability. When dye-based inks are used, the absorbed moisture can cause the dyes to migrate, thereby adversely affecting image quality. Furthermore, the absorptive layer tends to become increasingly soft as more moisture is absorbed such that it can easily be scraped or scratched during use. In most cases, application of a protective layer, such as a coating or overlaminate, still does not provide adequate protection in hot and humid environments.

SUMMARY OF THE INVENTION

The invention provides a method for printing an image on a substrate. The method is useful for printing a variety of substrates, in particular, non-porous substrates, such as plastics, for example data-carrying devices.

According to the invention, a carrier substrate is coated with a receptive layer. The receptive layer preferably includes at least two layers: a first transferable skin layer and a second absorptive layer. When applied to the carrier substrate, the receptive layer is positioned such that the absorptive later is located between the transferable skin layer and the carrier substrate. If desired, the receptive layer can include an intermediate layer, located between the transferable skin layer and the absorptive layer.

According to the invention, an image is printed on the transferable skin layer. Typically, liquid inks, such as ink jet ink, are used. The transferable skin layer allows the solvent to pass through to the absorptive layer, while collecting the colorant. Thus, the absorptive layer helps the printed image to dry while the colorant is retained by the transferable skin layer. Additionally, the drying process may be further enhanced with the assistance of an external heat source, circulating air (heated or unheated), radiation, etc.

Once the image is substantially dry, such that it will not smear or smudge during handling, the image is transferred to a final substrate. To transfer the image, at least some, substantially all, or all of the transferable skin layer (on which the image is printed) is transferred to a final substrate. All or most of the absorptive layer and absorbed solvents remain on the carrier substrate. If present, the intermediate layer may or may not, in whole or in part, transfer to the final substrate during print transfer.

Thus, a durable image is formed on the final substrate with a substantially thinner water-absorbing layer than other available water-based, ink jet printed devices. The durability of the print on the final substrate can be further improved by application of a protective layer such as a topcoat or overlaminate.

DETAILED DESCRIPTION OF THE INVENTION

Figure 1:
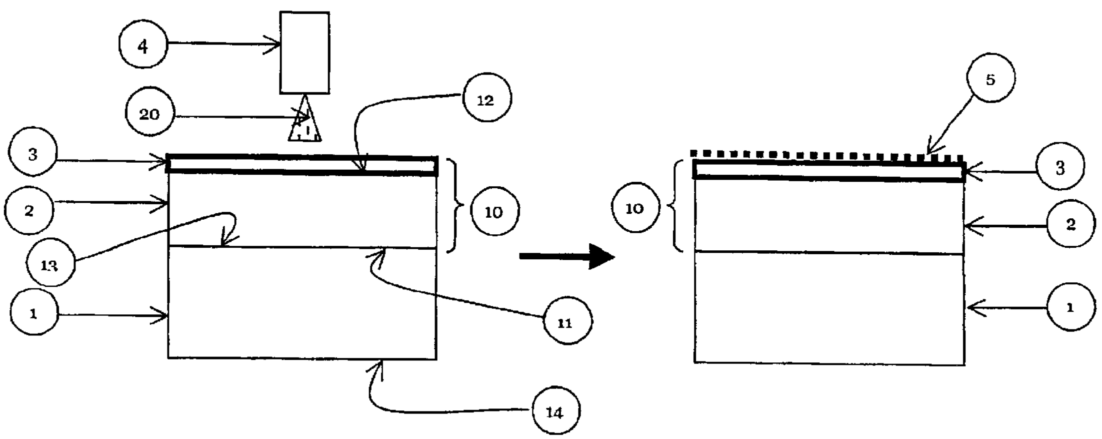
FIG. 1A is a process schematic for printing an image on a carrier substrate having a receptive layer.
FIG. 1B is a process schematic for lamination of a printed carrier substrate to a final substrate under heat and pressure.
FIG. 1C is a process schematic for transferring an image to a final substrate by removing the carrier substrate along with a majority (e.g., more than 50%) of the absorptive layer.
Figure 1:
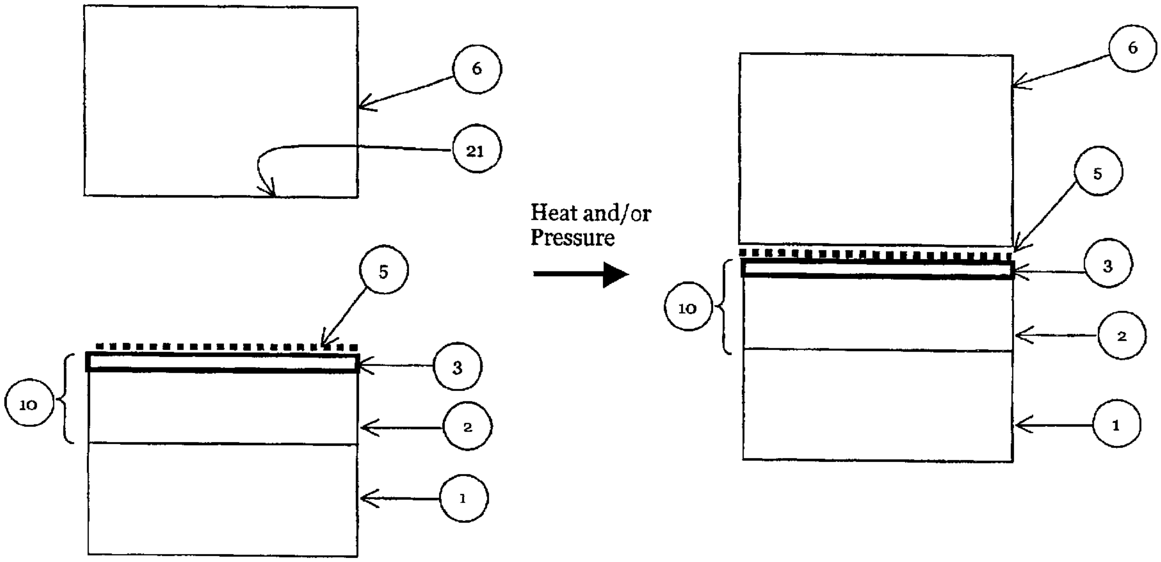
Figure 1:
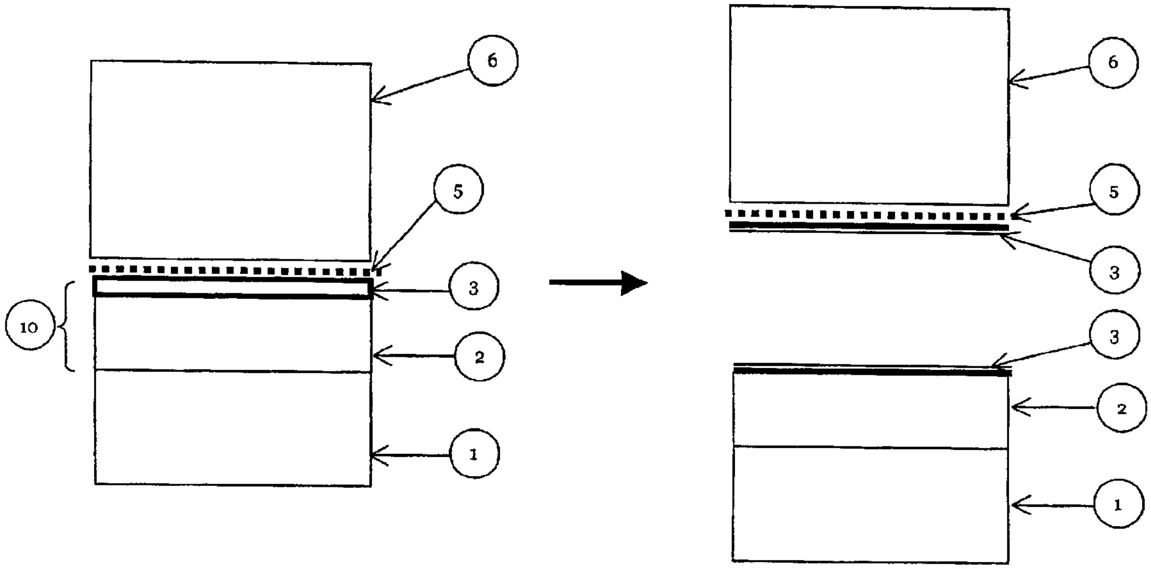

The invention provides a method for applying an image to a substrate, for example, a non-porous plastic substrate such as a data-carrying device. The method results in a printed substrate having a durable image.

I. Transfer Film

A first aspect of the invention is directed towards a transfer film comprising a carrier substrate and a receptive layer.

A. Carrier Substrate

The carrier substrate 1 is a porous or nonporous film or sheet. It can be in the form of a web or sheet in any desired size or shape. While the thickness of the carrier is not critical, the carrier 1 should be of sufficient thickness to provide dimensional stability to the transferred image during printing and transfer and to be removable without tearing following lamination of the image to the final substrate 6. The thickness of the carrier substrate 1 can vary depending on the material and end application. Typically, the carrier substrate 1 will have a thickness between 10 μm to 250 μm, more typically between 10 μm and 100 μm. The carrier substrate 1 can be opaque or transparent.

The carrier substrate 1 can be made of any suitable material, typically plastic or paper. Preferred plastic substrates include, but are not limited to, polyester, polypropylene, poly (vinyl fluoride), polyethylene, polyurethane, poly (ethylene terephthalate) (PET), poly (ethylene naphthanate) (PEN), polyamide, polycarbonate, cellulose acetate, ethylene vinyl acetate copolymers, polyolefin, polyimide, polycarbonate, etc. . . .

The carrier substrate 1 can be treated to modify or improve various properties. For example, the carrier substrate 1 may be treated or coated to improve wettability or adhesion. For example, the carrier substrate 1 may be coated with primers or tie coats to improve adhesion between the carrier substrate 1 and the absorptive layer 2. Suitable treatments are known and include, but are not limited to, corona treatment, flame treatment, priming, etching etc. . . The second surface 14 of the carrier substrate 1 (located opposite the first surface 13 of the carrier substrate 14 wherein the first surface 13 is coated with receptive layer 10) may be treated or coated to improve or modify slip property, flatness or handling properties. Additionally, the carrier substrate 1 may contain additives, including, but not limited to, fillers or colorant, such as pigment.

B. Receptive Layer

The receptive layer 10 is adhered to a first surface 13 of the carrier substrate 1. Generally, the receptive layer 10 includes at least two layers: a transferable skin layer 3 and an absorptive layer 2. When applied to the carrier substrate 1, the receptive layer 10 is positioned such that the absorptive layer 2 is proximate the carrier substrate (i.e., the absorptive layer 2 is between the carrier substrate 1 and the transferable skin layer 3).

1. Absorptive Layer

The function of the absorptive layer 2 is to absorb solvent from the ink 20 to facilitate drying of the ink 20. The absorptive layer 2 can include a single layer or multiple layers. The absorptive layer 2 may include more than one layer to increase the rate of solvent removal from the transferable skin layer 3 and/or to improve separation of transferable skin layer 3 from the absorptive layer 2 during image transfer.

The total thickness of the absorptive layer 2 (e.g., the thickness of the single layer or the combined thickness of the multiple layers) is preferably between 5 μm to 50 μm, more preferably between 10 μm and 30 μm.

The absorptive layer 2 preferably good cohesive strength and adhesive bond to the carrier substrate 1. Preferably, the absorptive layer has greater cohesive strength and adhesive bond to the carrier substrate 1 than the cohesive strength of the transferable skin layer 3 and the adhesive bond between the absorptive layer 2 and the transferable skin layer 3. The term "cohesive strength" refers to the bond strength between particles or molecules within a layer. "Good cohesive strength" means that the layer in question does not break apart during transfer. The term "adhesive bond" refers to the bond strength between two different layers. "Good adhesion" means that the two layers in question do not separate at the interface during transfer.

At least one absorptive layer 2 is made of (a) hydrophilic polymers; (b) a mixture of hydrophobic and hydrophilic polymers; or (c) a mixture of particulate filler combined with either (a) or (b), or both.

Generally, the absorptive layer 2 includes between 5% and 100% by weight hydrophilic polymer, more typically between 10% and 90% by weight, most preferably between 15% and 75% by weight. Suitable hydrophilic polymers include, but are not limited to, poly(vinyl alcohol) (PVA), poly(vinyl pyrrolidone) (PVP), poly (2-ethyl-2oxazoline), modified starch, hydroxyalkyl cellulose, for example, hydroxymethyl celluose, carboxyalkyl cellulose, for example, carboxymethyl cellulose, styrene butadiene rubber (SBR) latex, nitrile butadiene rubber (NBR) latex, vinyl pyrrolidone/vinyl acetate copolymer, vinyl acetate/acrylic copolymers, acrylic acid polymers, acrylic acid copolymers, acrylamide polymers, acrylamide copolymers, styrene copolymers of allyl alcohol, acrylic acid, malaeic acid, esters or anhydrides, alkylene oxide polymers and copolymers, gelatins, modified gelatins, and polysaccharides.

If desired, the absorptive layer 2 may contain between 0% and 30% by weight hydrophobic polymer, more typically between 1% and 25% by weight, most typically between 1% and 20% by weight. Suitable hydrophobic polymers include, but are not limited to, cellulosic polymers, such as ethyl cellulose, cellulose acetate, cellulose acetate butyrate, vinyl polymers, polyvinyl chloride, polyvinyl acetate, vinyl chloride vinyl acetate copolymers, ethylene vinyl acetate copolymer, acrylic polymers, polyurethane, polyester, and polyamide, polyolefin, polyimide, polycarbonate, etc. . . . The hydrophobic polymer can be in solution, suspension or emulsion form. Generally hydrophobic polymers are added to the absorptive layer 2 to improve adhesion of the absorptive layer 2 to the carrier substrate 1 and to prevent the adhesive layer from cohesive failure during print transfer or to improve separation of the transferable skin layer 3 from the absorptive layer 2 (or the intermediate layer 7, if present).

The absorptive layer(s) may also include particulate fillers to help increase the rate of solvent removal. Generally, the absorptive layer 2 includes between 0% and 60% by weight particulate filler, more preferably between 5% and 55% by weight, most preferably between 10% to 50% by weight. Generally, the particles within the particulate filler have a largest particle dimension between 0.01 μm and 15.0 μm, more typically between 0.01 μm to 10.0 μm, most typically between 0.01 μm and 5.0 μm. As used herein, the term "largest particle dimension" refers to the linear longest distance between two points on the particle. "Average particle dimension" refers to the average largest particle dimension of a collection of particles. Suitable particulate fillers, include, but are not limited to, silica, silica gel, alumina, alumina gel, boehmite, pseudoboehmite, clay, calcium carbonate, chalk, magnesium carbonate, kaolin, calcined clay, pyropylite, bentonite, zeolite, talc, synthetic aluminum silicates, sythetic calcium silicates, diatomatious earth, anhydrous silicic acid powder, aluminum hydroxide, barite, barium sulfate, gypsum, calcium sulfate, and organic particles such as hydrophobic polymeric beads.

Generally, an absorptive layer(s) 2 that includes more than 50% by weight particulate filler tends to have low cohesive strength and may break and transfer with the transferable skin layer 3 during image transfer. Transfer of the absorptive layer 2 is generally not desirable because the absorptive layer may continue to absorb moisture over the life of the substrate and may adversely affect durability. When dye-based inks are used, the absorbed moisture can cause the dyes to migrate, thereby adversely affecting image quality. Furthermore, the absorptive layer tends to become increasingly soft as more moisture is absorbed such that it can easily be scraped or scratched during use.

As mentioned above, the absorptive layer 2 includes at least one layer. An absorptive layer 2 having more than one layer can be created wherein the different layers have differing absorption properties. A multi-layered absorption layer 2 can be created by layering different combinations of hydrophilic polymers, hydrophobic polymers and particulate fillers.

The absorptive layer(s) 2 can be formed on the carrier substrate 1 by applying a solution or slurry containing (a) hydrophilic polymers; (b) a mixture of hydrophobic and hydrophilic polymers; or (c) a mixture of particulate fillers combined with either (a) or (b), or both combined with an organic or aqueous solvent, such as water, alcohol, ketones, esters, hydrocarbons, glycols, or mixtures thereof. Methods for applying such a solution or slurry are known and include conventional coating processes such as, but not limited to, slot die coating, rod coating, gravure coating, reverse gravure coating, roll coating, screen printing etc. followed by drying. Alternately, the absorptive layer 2 can be formed separately and applied to the substrate as a film.

2. Transferable Skin Layer

The transferable skin layer 3 allows solvent from the liquid ink 20 to pass through to the absorptive layer 2, while retaining the colorant. For example, if the colorant is a pigment, the pore size of the transferable skin layer 3 may be smaller than the particle size of the pigment such that the pigment particles are retained on the transferable skin layer 3. If the colorant is a dye, the dye may retained within the transferable skin layer 3, for example, the dye may be absorbed by the transferable skin layer 3.

The thickness of the transferable skin layer 3 is typically between 0.01 μm and 12 μm, more preferably between 0.1 μm and 5 μm, most preferably between 0.5 μm and 2 μm. The transferable skin layer 2 is made from (a) hydrophilic polymers; (b) a mixture of hydrophilic and hydrophobic polymers; or (c) a mixture of particulate filler with (a) or (b).

Generally, the transferable skin layer 3 includes between 5% and 100% by weight hydrophilic polymer, more preferably between 10% and 80% by weight, most preferably between 15% and 75% by weight hydrophilic polymer. Suitable hydrophilic polymers include, but are not limited to, poly(vinyl alcohol) (PVA), poly(vinyl pyrrolidone) (PVP), poly (2-ethyl-2-oxazoline), modified starch, hydroxyalkyl cellulose, for example, hydroxymethyl celluose, carboxyalkyl cellulose, for example, carboxymethyl cellulose, styrene butadiene rubber (SBR) latex, nitrile butadiene rubber (NBR) latex, vinyl pyrrolidone/vinyl acetate copolymer, vinyl acetate/acrylic copolymers, acrylic acid polymers, acrylic acid copolymers, acrylamide polymers, acrylamide copolymers, styrene copolymers of allyl alcohol, acrylic acid, malaeic acid, esters or anhydrides, alkylene oxide polymers and copolymers, gelatins, modified gelatins, and polysaccharides.

Preferably the transferable skin layer 3 includes less than 20% by weight, typically between 0% and 20% by weight hydrophobic polymer, more preferably between 0% and 10% by weight, most preferably between 0% and 5% by weight hydrophobic polymer. A transferable skin layer containing more than 20% of hydrophobic polymer may adversely affect image quality due to poor solvent absorption. Suitable hydrophobic polymers include, but are not limited to, cellulosic polymers, such as ethyl cellulose, cellulose acetate, cellulose acetate butyrate, vinyl polymers, polyvinyl chloride, polyvinyl acetate, vinyl chloride vinyl acetate copolymers, ethylene vinyl acetate copolymer, acrylic polymers, polyurethane, polyester, and polyamide, polyolefin, polyimide, polycarbonate, etc . . . These polymers can be used in solution, suspension or emulsion form. Typically, hydrophobic polymers are added to the transferable skin layer 3 to improve adhesion of the transferable skin layer 3 to the final substrate 6 and to increase water resistance of the transferable skin layer 3 to increase image 5 durability after transfer to the final substrate 6 or to facilitate transfer of the skin layer 3.

Preferably the transferable skin layer 3 includes between 0% to 80% by weight, more preferably between 15% and 75% by weight particulate filler, most preferably between 30% and 70% by weight. Generally, a smaller particle size will result in a more clear and vibrant image 5 after transfer to the final substrate 6. Larger particle sizes tend to result in a hazier image 5 after transfer. Typically, the particle size of the filler is between 0.01 μm to 15.0 μm, more typically between 0.01 μm and 10.0 μm, most preferably between 0.01 μm and 3.0 μm. Suitable particulate fillers, include, but are not limited to, silica, silica gel, alumina, alumina gel, boehmite, pseudoboehmite, clay, calcium carbonate, chalk, magnesium carbonate, kaolin, calcined clay, pyropylite, bentonite, zeolite, talc, synthetic aluminum silicates, sythetic calcium silicates, diatomatious earth, anhydrous silicic acid powder, aluminum hydroxide, barite, barium sulfate, gypsum, calcium sulfate, and organic particles such as hydrophobic polymeric beads. The particulate filler can be used to modify pore size and the rate of solvent removal. Additionally, particulate filler may help in separation of transferable skin 3 from the absorptive layer 2 by reducing the cohesive strength of the transferable skin layer 3, aiding separation of the transferable skin layer 3 from the absorptive layer 2 during image transfer.

Preferably the transferable skin layer 3 has low cohesive strength and/or low adhesive bond to the absorptive layer 2 such that the transferable skin layer 3 can be readily transferred to the final substrate 6 by the application of heat and pressure, followed by removal of the carrier substrate 1. Preferably the cohesive strength of the transferable skin layer 3 and/or adhesive bond between the transferable skin layer 3 and the absorptive layer 2 is less than the adhesive bond between the transferable skin layer 3 and the final substrate such that the transferable skin layer 3 is readily transferred to the final substrate 6 during image transfer. The terms "cohesive strength" and "adhesive bond" are defined above. "Low cohesive strength" means that the layer in question is likely to break apart during transfer. "Low adhesion" means that the two layers in question are likely to separate at the interface during transfer.

In one embodiment, the adhesive bond strength between the transferable skin layer 3 and the final substrate 6 is greater than the cohesive strength of the transferable skin layer 3. In this embodiment, at least some (e.g., more than 5%) of the transferable skin layer 3 transfers to final substrate 6 with at least some of the skin layer 3 remaining adhered to the adsorptive layer 2 of the carrier substrate 1. In an alternate embodiment, the adhesive bond strength of the transferable skin layer 3 to the final substrate 6 is greater than the adhesive bond strength between the transferable skin layer 3 and the absorptive layer 2. In this embodiment, all or substantially all of the transferable skin layer 3 is transferred to the final substrate 6. As used herein, the term "substantially all" means that a majority (i.e., greater than 50%, typically greater than 75%) of the transferable skin layer 3 is transferred to the final substrate 6.

The transferable skin layer 3 can be formed on the absorptive layer 2 by applying a solution or slurry containing (a) hydrophilic polymers; (b) a mixture of hydrophilic and hydrophobic polymers; or (c) a mixture of particulate filler with (a) or (b) combined with an aqueous or organic solvent, or mixtures thereof, to the absorptive layer 2. The solution or slurry may be applied by conventional coating processes including, but not limited to, slot die coating, rod coating, gravure coating, reverse gravure coating, roll coating, screen printing etc. After the solution or slurry is applied it is allowed to dry. If desired, the drying rate can be increased by the application of heat using known methods. Alternately, the transferable skin layer 3 can be formed separately and applied to the absorptive layer 2 as a film.

3. Intermediate Layer

In an alternate embodiment, an intermediate layer 7 is interposed between the transferable skin layer 3 and absorptive layer(s) 2. The intermediate layer 7 serves as a release layer that facilitates the removal of the transferable skin layer 3 from the absorptive layer 2 when the image 5 is transferred to a final substrate 6. Generally, the intermediate layer 7 enhances chemical incompatibility between the transferable skin layer 3 and absorptive layer 2. Additionally, when present the intermediate layer 7 serves as a barrier to reduce absorption of colorant by the absorptive layer(s) 2.

During image transfer, the transferable skin layer 3 may be separated from the intermediate layer 7, leaving all or substantially all of the intermediate layer 7 attached to the absorptive layer 2 (e.g., none of the intermediate layer 7 transfers with the transferable skin layer 3). Alternately, all or substantially all of the intermediate layer 7 can remain attached to the transferable skin layer 3 during image transfer. In the later embodiment, the intermediate layer 7 covers most of the outer surface 21 of the final substrate 6 after image 5 transfer. In yet another embodiment, some of the intermediate layer 7 is transferred with the transferable skin layer 3 and part of the intermediate layer 7 remains with the absorptive layer 2.

Figure 2:
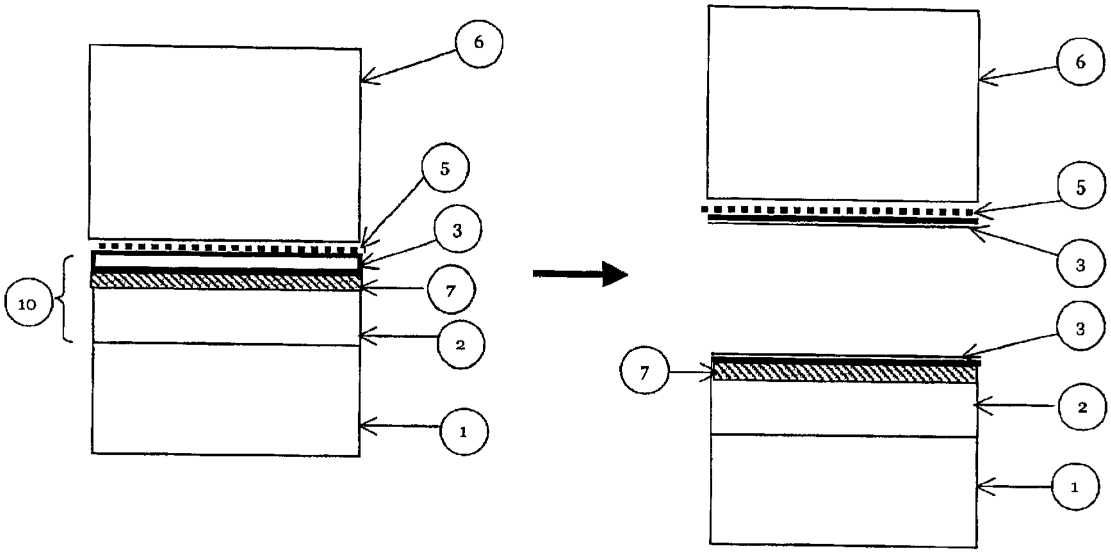
FIG. 2A is a process schematic showing cohesive failure of skin layer during separation of the carrier and final substrate when an intermediate layer is present.
FIG. 2B is a process schematic showing adhesive failure between a transferable skin layer and intermediate layer during separation of the carrier and final substrate when an intermediate layer is present.
FIG. 2C is a process schematic showing adhesive failure between an intermediate layer and an absorptive layer during separation of the carrier and final substrate when an intermediate layer is present.
Figure 2:
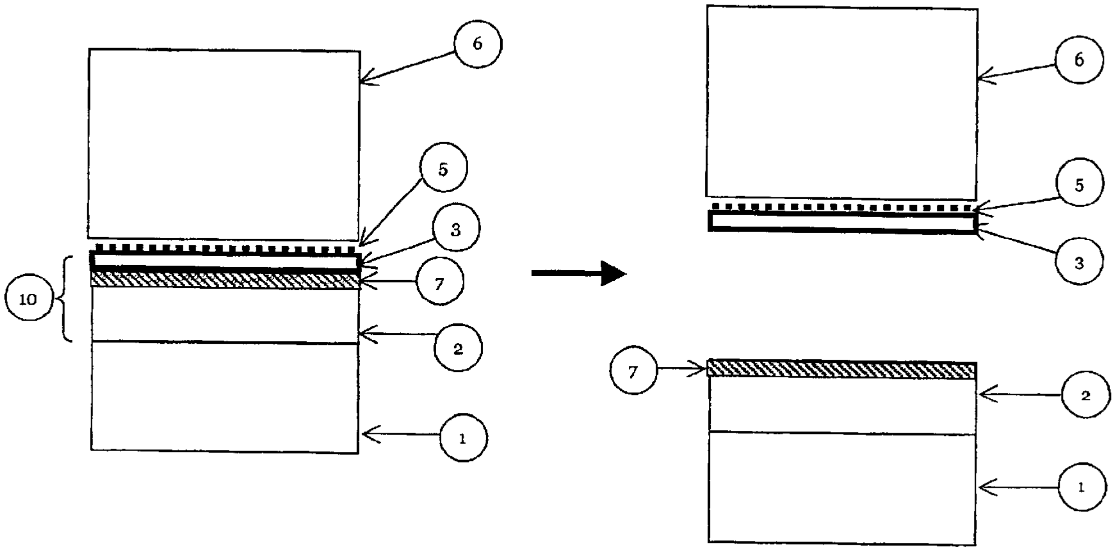
Figure 2:
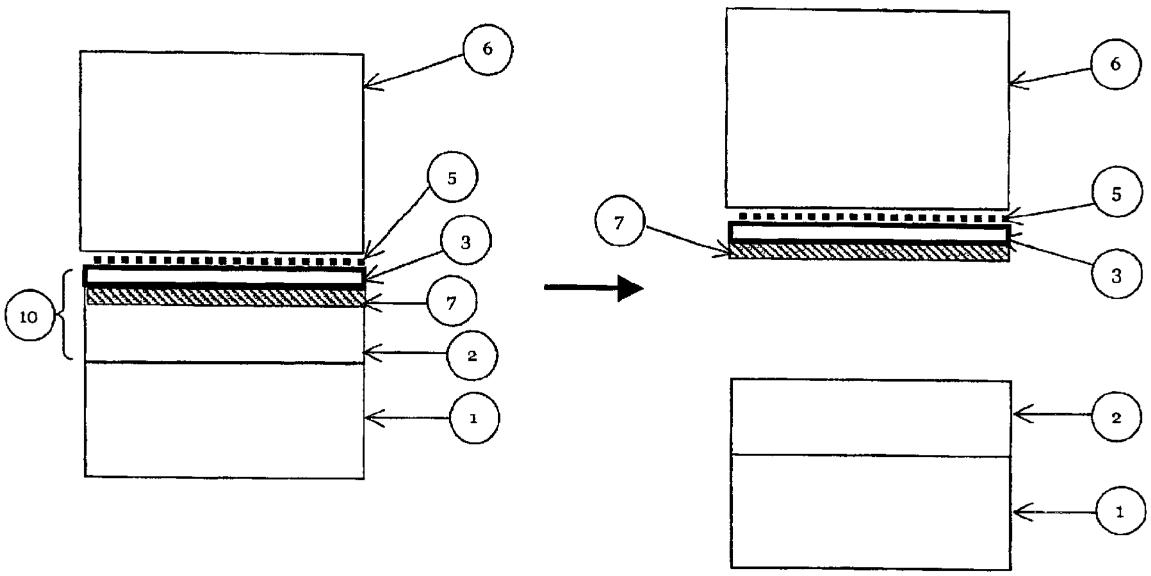

FIG. 2A is a schematic showing a scenario where the adhesive strength between the absorptive layer 2 and the intermediate layer 7, and cohesive strength of intermediate layer 7 is greater then the cohesive strength of the transferable skin layer 3. As a result, at least some of the transferable skin layer 3 is transferred to the final substrate 6, leaving all, or substantially all, of the intermediate layer 7 and at least some of the transferable skin layer 3 attached to the absorptive layer 2 on the carrier substrate.

FIG. 2B is a schematic showing a scenario where the cohesive strength of the intermediate layer 7, the cohesive strength of the transferable skin layer 3, and the adhesive strength between the intermediate layer 7 and the absorptive layer 2 are greater than the adhesive strength between the intermediate layer 7 and the transferable skin layer 3. As a result, all, or substantially all, of the transferable skin layer 3 transfers to the final substrate 6, leaving all, or substantially all, of the intermediate layer 7 attached to the absorptive layer 2 on the carrier substrate 1.

FIG. 2C is a schematic showing a scenario wherein the cohesive strength of the transferable skin layer 3, the cohesive strength of the intermediate layer 7, and the adhesive strength between the transferable skin layer 3 and the intermediate layer 7 are greater than the adhesive strength between the absorptive layer 2 and the intermediate layer 7. In this scenario, all, or substantially all, of the transferable skin layer 3 and all or substantially all of the intermediate layer 7 transfers to the final substrate 6 with the image.

The intermediate layer 7 is formed from (a) hydrophilic polymers; (b) a mixture of hydrophobic and hydrophilic polymers; (c) hydrophobic polymer; or (d) a mixture of particulate fillers with (a), (b) or (c).

Generally, a composition containing hydrophobic polymers increases the chemical incompatibility between the transferable skin layer 3 and the absorptive layer 2, resulting in good separation of the transferable skin layer 3 from the absorptive layer. However, when present in substantial amount, hydrophobic polymers may hinder absorption of solvents into the absorptive layer 2. Therefore, a thin layer of hydrophobic polymer, or a mixture of hydrophobic and hydrophilic polymers, is preferred. Generally, the thickness of the intermediate layer 7 is between 0.1 $\mu$m and 5 $\mu$m, more preferably between 0.1 $\mu$m and 2 $\mu$m.

Generally, the intermediate layer 7 contains between 1% and 100% by weight hydrophobic polymer, more preferably between 5% and 80% by weight, most preferably between 10% and 60% by weight. Suitable hydrophobic polymers include, but are not limited to, cellulosic polymers, such as ethyl cellulose, cellulose acetate, cellulose acetate butyrate, vinyl polymers, polyvinyl chloride, polyvinyl acetate, vinyl chloride vinyl acetate copolymers, ethylene vinyl acetate copolymer, acrylic polymers, polyurethane, polyester, polyamide, polyolefin, polyimide, polycarbonate, etc. . . . These polymers can be used in solution, suspension or emulsion forms.

The intermediate layer may also contain between 0% and 95% by weight hydrophilic polymer, more preferably between 5% and 80% by weight, most preferably between 10% and 70% by weight hydrophilic polymer. Suitable hydrophilic polymers include, but are not limited to, poly (vinyl alcohol) (PVA), poly(vinyl pyrrolidone) (PVP), poly (2-ethyl-2-oxazoline), modified starch, hydroxyalkyl cellulose, for example, hydroxymethyl celluose, carboxyalkyl cellulose, for example, carboxymethyl cellulose, styrene butadiene rubber (SBR) latex, nitrile butadiene rubber (NBR) latex, vinyl pyrrolidone/vinyl acetate copolymer, vinyl acetate/acrylic copolymers, acrylic acid polymers, acrylic acid copolymers, acrylamide polymers, acrylamide copolymers, styrene copolymers of allyl alcohol, acrylic acid, malaeic acid, esters or anhydrides, alkylene oxide polymers and copolymers, gelatins, modified gelatins, and polysaccharides.

Optionally, particulate fillers may be added to increase solvent diffusion through the intermediate layer 7 into the absorptive layer 2. Preferably, the intermediate layer includes between 0% and 80% by weight particulate filler, more preferably between 0% and 70% by weight, most preferably between 0% and 60% by weight. Generally, the particle size of the filler is between 0.01 $\mu$m and 15.0 $\mu$m, more typically between 0.01 $\mu$m and 10.0 $\mu$m, most preferably between 0.01 $\mu$m and 5.0 $\mu$m. Suitable particulate fillers, include, but are not limited to, silica, silica gel, alumina, alumina gel, boehmite, pseudoboehmite, clay, calcium carbonate, chalk, magnesium carbonate, kaolin, calcined clay, pyropylite, bentonite, zeolite, talc, synthetic aluminum silicates, sythetic calcium silicates, diatomatious earth, anhydrous silicic acid powder, aluminum hydroxide, barite, barium sulfate, gypsum, calcium sulfate, and organic particles such as hydrophobic polymeric beads. The intermediate layer 7 can be formed by applying a solution or slurry containing (a) hydrophilic polymers; (b) a mixture of hydrophobic and hydrophilic polymers; (c) hydrophobic polymer; or (d) a mixture of particulate fillers with (a), (b) or (c) combined with an aqueous or organic solvent, or mixtures thereof, on the absorptive layer 2. The solution or slurry may be applied by conventional coating processes including, but not limited to, slot die coating, rod coating, gravure coating, reverse gravure coating, roll coating, screen printing etc. After the solution or slurry is applied it is allowed to dry. If desired, the drying rate can be increased by the application of heat using known methods. Alternately, the intermediate layer 7 be applied to the transferable layer 3. In yet another embodiment, the intermediate layer 7 is prepared as a film and then applied to either the transferable layer 3 or the absorptive layer 2.

II. Final Substrate

The final substrate 6 can be a porous or nonporous material made from paper, plastic, ceramic, metal, glass or other suitable material, depending on the end use. It can be in the form of a film, sheet or other desired shape or size. The final substrate 6 can be opaque or transparent. The thickness of the final substrate may also depend on the desired end use. Typically, the final substrate 6 is constructed from plastic due to its low cost, light weight, high strength, good durability etc. The plastic substrate may be in the form of film, sheet, a laminated sheet, or even a molded or formed article.

In one embodiment, the final substrate is used to prepare a plastic card such as a data-carrying device, for example, for identification and electronic transactions. Common examples of such data carrying devices are credit cards, ATM cards, ID cards, badges, membership cards, access cards etc . . .

Preferred plastics include, but are not limited to, polyester, polyamide, polycarbonate, cellulose acetate, ethylene vinyl acetate copolymers, polyolefin, polyimide, polycarbonate, polyvinyl chloride, vinyl chloride vinyl acetate copolymers etc. For example, the final substrate 6 can be a laminated sheets made from, poly (vinyl chloride) (PVC), vinyl chloride vinyl acetate copolymers, glycol modified poly (ethylene terephthalate) (PETG), polyester, polyolefin, polyimide, polycarbonate, or acrylonitrilebutadiene-styrene terpolymer (ABS). Such sheets are commonly used in plastic cards such as credit cards, bank card, ID cards membership cards, badges etc. and can be used in any shape or size. The plastic may or may not contain organic or inorganic fillers.

The final substrate 6, in particular a paper substrate, may be coated, if desired. For example, the final substrate 6 may be further treated or coated to improve adhesion of the image 5. Such treatments include, but are not limited to, corona treatment, flame treatment, priming, adhesive coating, etching etc. The nature and extent of the treatment may depend on the properties of the final substrate 6 and the requirements of the end product.

III. Method

According to the method of the invention, an image is printed on the carrier substrate, which has been previously coated with a receptive layer having at least two layers. Once the image is substantially dry, it is transferred to a final substrate.

The method will now be described in more detail with reference to the figures.

As shown in FIG. 1A, a liquid ink 20, containing colorant, such as a pigment or dye, is used to print an image 5 on the transferable skin layer 3. The absorptive layer 2 absorbs the solvent from the ink while the image forming colorant remains on the transferable skin layer 3.

Printing can be accomplished using any known method. Typically, printing is performed using liquid inks that contain a colorant and a solvent. As used herein, the term "solvent" includes volatile organic solvents, water, and combinations thereof. The solvent can function as a solvent in the conventional sense, that dissolves solute, or as a dispersant or carrier, for example, when colorant does not dissolve. Most typically, printing is performed using a liquid ink that includes water. In addition to colorant and a solvent, the ink may contain other ingredients such as, but not limited to, binders, co-solvents, surfactants, stabilizers and other additives. Although the invention has been described with reference to ink jet printing, other technologies in which a solvent absorptive surface is useful can be used. For example, printing technologies such as liquid or dry electrophotography, screen printing, etc. may be used.

Examples of images include, but are not limited to, a person's name, address, account number, or a picture. Preferably the picture is printed onto the carrier substrate in a reverse or mirror image, such that the image will be properly oriented when transferred to the final substrate.

As shown in FIG. 1B, after the image 5 is substantially dry (i.e., so that the image will not smear or smudge), the image 5 is transferred to a final substrate 6. Image transfer is preferably accomplished by laminating the carrier 1 and final 6 substrates together, for example, by the application of heat and/or pressure. Generally, lamination is performed at a temperature between 60° F. and 400° F. (16° C. and 204° C.), more typically between 100° F. and 350° F. (38° C. and 177° C.), most typically between 150° F. and 300° F. (66° C. and 149° C.) and at a pressure between 1.0 psi and 3000 psi, more preferably between 10.0 psi and 2500 psi, most preferably between 50.0 psi and 2000 psi. Lamination can be performed using commercially available equipment.

The carrier substrate 1 is then removed from the final substrate 6 (FIG. 1C). According to the invention, the image 5 is transferred to the final substrate 6, along with a part or all of the transferable skin layer 3 (discussed above), leaving all or most of the absorptive layer 2 (discussed above) and absorbed solvents on the carrier substrate 1. If present, the intermediate layer 7 may or may not transfer to the final substrate 6 during print transfer.

According to the invention, all or most of the absorptive layer 2 remains attached to the carrier substrate 1. Thus, the final substrate 2 thus has very little water-absorbing layer. As discussed above, an absorptive layer tends to absorb moisture over the life of the device and may adversely affect durability. For example, the absorptive layer 2 tends to become increasingly soft as moisture is absorbed such that it can easily be scraped or scratched during use.

Lamination of the transfer film to the final substrate, image transfer, and removal of the final substrate (shown in FIGS. 1B and 1C) may be performed as separate steps or as a continuous process, for example, using a heated roller for lamination followed by separation of carrier substrate 1 from the final substrate 6.

Figure 3:
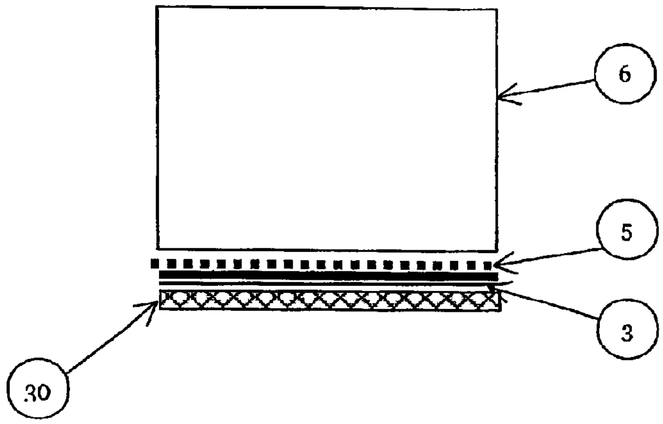
FIG. 3A shows a final substrate with an image, part of a transferable skin layer, and a protective coating.
FIG. 3B shows a final substrate with an image, a transferable skin layer, and a protective coating.
FIG. 3C shows a final substrate with an image, a transferable skin layer, an intermediate layer, and a protective coating.
Figure 3:
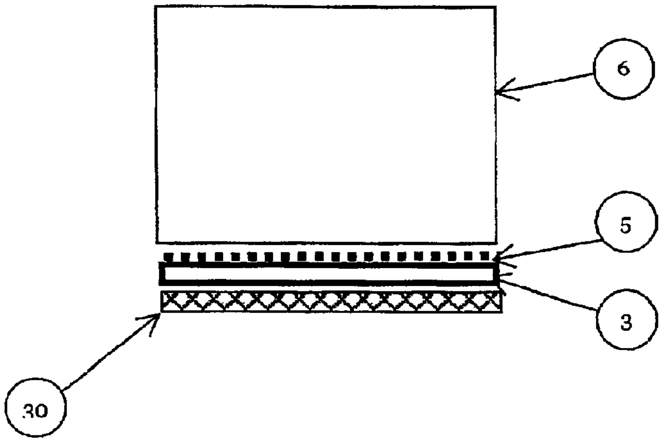
Figure 3:
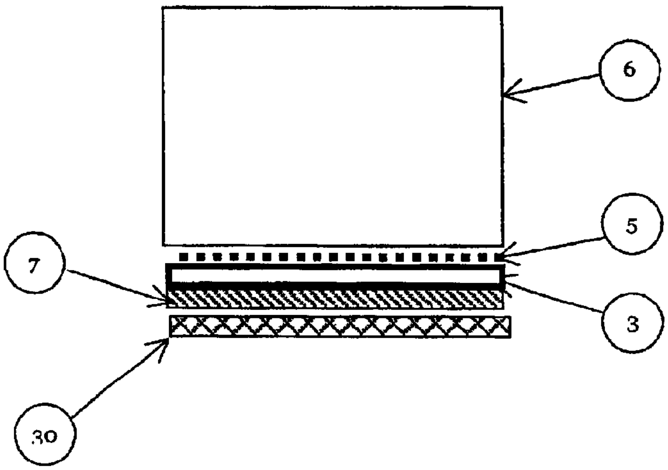

Depending on the end use of the final substrate 2, an optional protective layer 30 may be applied to the final substrate 6 on top of the image 5 to improve image 5 durability (FIG. 3). The protective layer 30 can be in the form of an overlaminate, topcoat or varnish and can be formed using heat seal, pressure sensitive, ultraviolet (UV) curable, or other polymers. Suitable materials for protective layers 30 are known and include, but are not limited to, acrylics, waxes, polyurethane, polyester, UV reactive monomers and oligomers or overlaminates such as films, for example, polyester, PET, PEN, polypropylene and polycarbonate. The protective layer 30 may also include components that strongly absorb ultraviolet radiation to reduce damage to the underlying image, for example, 2-hydroxybenzophenone, oxalanilides, aryl esters, hindered amine light stabilizers, such as bis (2,2,6,6,-tetramethyl-4-piperidinyl)sebacate, and combinations thereof. The protective layer 30 may also contain components that provide protection from biological attack, such as fungicides and bacteriocides.

The protective layer 30 can be applied using any known method, including but not limited to, thermal transfer, lamination with heat and/or pressure, screen printing, spray, dip coating, etc . . .

EXAMPLES

The following examples are presented to illustrate the invention and to assist one of ordinary skill in making and using the same. The examples are not intended in any way to otherwise limit the scope of the invention.

Example-1

In this Example, the carrier substrate was a polyester film (Grade—2600 commercially available from Mitsubishi, Greer, S.C.). The absorptive layer was formed on the carrier substrate by applying a solution containing 50 g of a 20% silica dispersion (Snowtex-0, commercially available from Nissan Chemicals, Houston, Tex.) and 83 g of 18% aqueous solution of polyvinyl alcohol (PVA) (Airvol 205, commercially available from Air Products, Allentown, Pa.) by reverse gravure printing. The solution was applied to carrier substrate to obtain a dry thickness of about 22 μm. The transferable skin layer was formed on the dried absorptive layer by applying a solution containing 70 g of a 20% silica dispersion (Snowtex-0) and 33 g of 18% aqueous solution of PVA (Airvol 205). The solution was applied to the absorptive layer with a wire wound rod #5 (mayer rod) to obtain a dry thickness of about 2 μm. The final substrate was a poly(vinyl chloride) (PVC) card. One side of the final substrate was coated with a vinyl chloride-vinyl acetate copolymer film (VYLF, commercially available from Union Carbide, Danbury, Conn.) by transferring 1 μm drying coating from a transfer using hot roll laminator to obtain a dry thickness of about 1 μm.

An ink jet printer was used to print an image on the receptive layer of the carrier substrate using a water-based ink. The image was allowed to dry. After the image was dry, it was transferred to the final substrate by laminating the carrier and final substrates together in a hot roll laminator at 280° F., at a roller speed of 0.7 inches per second and a pressure setting of 40 psi. The carrier and final substrates were then separated.

Visual inspection of the carrier and final substrates revealed that the image was transferred to the final substrate, leaving the absorptive layer on the carrier substrate.

Example-2

In this Example, the carrier substrate was the same polyester film (Grade—2600) as used in Example 1. The absorptive layer was formed essentially as described in Example 1 by applying a solution containing 100 g of Aluminasol 100 (10% Alumina dispersion, commercially available from Nissan Chemicals) and 83 g of an 18% aqueous solution of PVA (Airvol 205) onto the carrier substrate to a dry thickness of about 18 μm. The transferable skin layer was formed, essentially as described in Example 1, by applying a solution containing 70 g of a 20% silica dispersion (Snowtex-0) and 33 g of an 18% aqueous solution of PVA (Airvol 205) onto the absorptive layer to a dry thickness of about 2 μm. The final substrate was a PVC card. As in Example 1, the final substrate was coated with a vinyl chloride-vinyl acetate copolymer (VYLF) to a dry thickness of about 1 μm.

An image was printed on the transferable skin layer on the carrier substrate using an ink jet printer as described above. The image was allowed to dry and then transferred to the final substrate by laminating the carrier and final substrates in a hot roll laminator as described above.

Visual inspection revealed that the image was transferred to the final substrate. The absorptive layer remained on the carrier substrate.

Example-3

In this example, the carrier substrate was again a polyester film (Grade—2600). A first absorptive layer was formed, essentially as described in Example 1, by applying a solution containing 50 g of a 20% silica dispersion (Snowtex-0) and 83 g of an 18% aqueous solution of PVA (Airvol 205). The solution was coated on the carrier substrate, essentially as described in Example 1, to a dry thickness of about 20 μm. A second absorptive layer was formed in the same manner by applying a solution containing 70 g of a 20% silica dispersion (Snowtex-0) and 33 g of an 18% aqueous solution of PVA (Airvol 205) onto the absorptive layer to a dry thickness of about 2 μm. A transferable skin layer was formed, essentially as described in Example 1, by applying a solution containing 70 g of a 20% silica dispersion (Snowtex-0) and 33 g of an 18% aqueous solution of PVA (Airvol 205) onto the absorptive layer to a dry thickness of about 2 μm. The final substrate was a PVC card coated with a vinyl chloride-vinyl acetate copolymer (VYLF) as described above.

An image was printed on the transferable skin layer of the carrier substrate as described above. The image was allowed to dry and was then transferred to the final substrate by lamination, essentially as described above.

Visual inspection revealed that the image was transferred to the final substrate along with the transferable skin layer. Both the first and second absorptive layers remained on the carrier substrate.

Example-4

In this Example, the carrier substrate was the same polyester film used in Example 1, above. An absorptive layer was formed on the carrier substrate by applying a solution containing 50 g of a 20% silica dispersion (Snowtex-0) and 83 g of 18% aqueous solution of PVA (Airvol 205) as described above to obtain a dry thickness of about 22 μm. An intermediate layer was formed by applying a 5% solution of vinyl chloride-vinyl acetate copolymer (VYLF) in methyl ethyl ketone onto the absorptive layer, using wire wound rod #3, to a dry thickness of about 0.8 μm. A transferable skin layer was formed by applying a solution containing 70 g of a 20% silica dispersion (Snowtex-0) and 33 g of an 18% aqueous solution of PVA (Airvol 205) to the intermediate layer, essentially as described above, to a dry thickness of about 2 μm. The final substrate was a PVC card coated with a vinyl chloride-vinyl acetate copolymer, as described above.

An image was printed onto the transferable skin layer of the carrier substrate using an ink jet printer, essentially as described above. The image was allowed to dry and was then transferred to the final substrate by lamination, as described above.

Visual inspection revealed that the image was transferred to the final substrate along with most of the transferable skin layer. The absorptive layer and intermediate layer remained adhered to the carrier substrate.

Example-5

In this example, the carrier substrate was the same a polyester film (Grade—2600) used in Example 1. A absorptive layer was formed onto the carrier substrate by applying a solution containing 50 g of a 20% silica dispersion (Snowtex-0) and 83 g of an 18% aqueous solution of PVA (Airvol 205) to the carrier substrate, as described in Example 1, to a dry thickness of about 22 μm. An intermediate layer was formed by applying a solution containing 10 g of 5% vinyl chloride-vinyl acetate copolymer (VYLF) in methyl ethyl ketone (MEK) and 10 g of MEK-ST (30% silica dispersion in MEK, commercially available from Nissan Chemicals) to the absorptive layer to a dry thickness of about 0.8 μm. A transferable skin layer was formed by applying a solution containing 70 g of a 20% silica dispersion (Snowtex-0) and 33 g of an 18% aqueous solution of PVA (Airvol 205) onto the intermediate layer to a dry thickness of about 2 μm. The final substrate was again a PVC card coated with a vinyl chloride-vinyl acetate copolymer.

An image was printed onto the transferable skin layer of the carrier substrate and transferred to the final substrate as described above.

Visual inspection revealed that the image was transferred to the final substrate along with the transferable skin layer. The intermediate and absorptive layers remained on the carrier substrate.

Example-6

In this example, the carrier substrate was the same polyester film (Grade—2600) used in Example 1. An absorptive layer was formed by applying a solution containing 100 g of Aluminasol 100and 83 g of an 18% aqueous solution of PVA (Airvol 205) onto the carrier substrate to a dry thickness of about 18 μm. An intermediate layer was formed on the absorptive layer by applying a 5% solution of vinyl chloride-vinyl acetate copolymer (VYLF) in methyl ethyl ketone onto the absorptive layer to a dry thickness of about 0.8 μm. A transferable skin layer was formed by applying a solution containing 70 g of a 20% silica dispersion (Snowtex-0) and 33 g of 18% aqueous solution of PVA (Airvol 205) to the intermediate layer, essentially as described above, to a dry thickness of about 2 μm. The final substrate was again a PVC card coated with a vinyl chloridevinyl acetate copolymer, described above.

An image was printed on the transferable skin layer and transferred to the final substrate essentially as described above.

Visual inspection revealed that the image was transferred to the final substrate with the transferable skin layer. The absorptive layer remained on the carrier substrate.

Example-7

As described in Example 1, above, the substrate was a polyester film (Grade—2600). A absorptive layer was prepared by applying a solution containing 100 g of Aluminasol 100 and 83 g of an 18% aqueous solution of PVA (Airvol 205) to the carrier substrate, essentially as described above, to a dry thickness of about 18 μm. An intermediate layer was formed by applying a solution containing a 1.25% solution of vinyl chloride-vinyl acetate copolymer (VYLF) in methyl ethyl ketone onto the absorptive layer to a dry thickness of less than 0.5 μm. A transferable skin layer was formed by applying a solution containing 70 g of a 20% silica dispersion (Snowtex-0) and 33 g of an 18% aqueous solution of PVA (Airvol 205) onto the intermediate layer, essentially as described above, to a dry thickness of about 2 μm. The final substrate was again a PVC card coated with a vinyl chloride-vinyl acetate copolymer.

An image was printed onto the transferable skin layer of the carrier substrate and transferred to the final substrate, essentially as described above.

Visual inspection revealed that the image was transferred to the final substrate with the transferable skin layer leaving the absorptive layer on the carrier substrate.

Example-8

As described in Example 1, above, the substrate was a polyester film (Grade—2600). An absorptive layer was prepared by applying a solution containing 100 g of Aluminasol 100 and 83 g of an 18% aqueous solution of PVA (Airvol 205) onto the carrier substrate, essentially as described above, to a dry thickness of about 18 μm. An intermediate layer was formed by applying a 0.375% solution of acrylic polymer (Elvacite 2051, commercially available from Ineos acrylics Incorporated, Corova, Tenn.) in methyl ethyl ketone onto the absorptive layer to a dry thickness of less than 0.5 μm. A transferable layer was formed by applying a solution containing 70 g of a 20% silica dispersion (Snowtex-0) and 33 g of an 18% aqueous solution of PVA (Airvol 205) onto the intermediate layer, essentially as described above, to a dry thickness of about 2 μm. The final substrate was again a PVC card coated with a vinyl chloride-vinyl acetate copolymer.

An image was printed onto the transferable skin layer of the carrier substrate and transferred to the final substrate essentially as described above.

Visual inspection revealed that the image was transferred to the final substrate leaving the absorptive layer on the carrier substrate.

Example-9

In this Example, the carrier substrate was again a polyester film (Grade—2600). A absorptive layer was formed by applying a solution containing 100 g of Aluminasol 100 and 83 g of 18% aqueous solution of PVA (Airvol 205) to the carrier substrate, essentially as described above, to a dry thickness of about 18 μm. An intermediate layer was formed by applying a 5% solution of poly(2-ethyl-2oxazoline) (Aquazol Al, commercially available from Polymer Chemistry Innovations, State College, Pa.) in MEK onto the absorptive layer, essentially as described above, to a dry thickness of about 0.8 μm. A transferable skin layer was formed by applying a solution containing 70 g of a 20% silica dispersion (Snowtex-0) and 33 g of an 18% aqueous solution of PVA (Airvol 205) onto the intermediate layer, essentially as described above, to a dry thickness of about 2 μm.

The final substrate was again a PVC card coated with a vinyl chloride-vinyl acetate copolymer.

An image was printed onto the transferable skin layer of the carrier substrate and transferred to the final substrate essentially as described above.

Visual inspection revealed that the image was transferred to the final substrate leaving the absorptive layer on the carrier substrate.

Example-10

In this Example, the carrier substrate was again a polyester film (Grade—2600). A absorptive layer was formed by applying a solution containing 50 g of a 20% alumina coated silica dispersion (Snowtex-C, commerciall available from Nissan Chemicals, Houston, Tex.) and 83 g of an 18% aqueous solution of PVA (Airvol 205), essentially as described above, to a dry thickness of about 18 μm. A transferable skin layer was formed by applying a solution containing 70 g of a 20% silica dispersion (Snowtex-0) and 33 g of 18% aqueous solution of PVA (Airvol 205) onto the absorptive layer, essentially as described above, to a dry thickness of about 2 μm. The final substrate was again a PVC card coated with a vinyl chloride-vinyl acetate copolymer.

An image was printed onto the transferable skin layer of the carrier substrate and transferred to the final substrate essentially as described above.

Visual inspection revealed that the image was transferred to the final substrate leaving the absorptive layer on the carrier substrate.

What is claimed is:

1. A transfer film comprising:

a carrier substrate;

solvent absorbing layer; and a transferable skin layer;

wherein the solvent absorbing layer is adhered to the carrier substrate, wherein the solvent absorbing layer is configured to absorb solvent from the ink upon printing of image on the transferable skin layer, wherein the solvent absorbing layer is located between the transferable skin layer and the carrier substrate, wherein the solvent absorbing layer and the transferable skin layer are separated and distinct layers and wherein the carrier substrate comprises a polymer selected from the group consisting of polyester, polypropylene, poly (vinyl fluoride), polyethylene, polyurethane, poly (ethylene terephthalate) (PET), poly (ethylene naphthanate) (PEN), polyamide, cellulose acetate, ethylene vinyl acetate copolymers, polyolefin, polyimide, and polycarbonate.

2. The transfer film of claim 1, wherein the carrier substrate comprises poly (ethylene terephthalate).

3. The transfer film of claim 1, wherein the solvent absorbing layer comprises more than one layer.

4. The transfer film of claim 1, wherein the solvent absorbing layer comprises 5% to 100% by weight hydrophilic polymer, 0% to 30% by weight hydrophobic polymer, and 0% to 60% by weight particulate filler.

5. The transfer film of claim 4, wherein the hydrophilic polymer is selected from the group consisting of poly(vinyl alcohol) (PVA), poly(vinyl pyrrolidone) (PVP), poly (2-ethyl-2-oxazoline), modified starch, hydroxyalkyl cellulose, carboxyalkyl cellulose, styrene butadiene rubber (SBR) latex, nitrile butadiene rubber (NBR) latex, vinyl pyrrolidone/vinyl acetate copolymer, vinyl acetate/acrylic copolymers, acrylic acid polymers, acrylic acid copolymers, acrylamide polymers, acrylamide copolymers, styrene copolymers of allyl alcohol, acrylic acid, malaeic acid, esters or anhydrides, alkylene oxide polymers and copolymers, gelatins, modified gelatins, and polysaccharides.

6. The transfer film of claim 5, wherein styrene copolymers comprise styrene copolymers of allyl alcohol, acrylic acid, malaeic acid, esters or anhydrides.

7. The transfer film of claim 4, wherein the hydrophobic polymer is selected from the group consisting of cellulosic polymers, vinyl polymers, polyvinyl chloride, polyvinyl acetate, vinyl chloride vinyl acetate copolymers, ethylene vinyl acetate copolymer, acrylic polymers, polyurethane, polyester, polyamide, polyolefin, polyimide, and polycarbonate.

8. The transfer film of claim 4, wherein the particulate filler is selected from the group consisting of silica, silica gel, alumina, alumina gel, boehmite, pseudoboehmite, clay, calcium carbonate, chalk, magnesium carbonate, kaolin, calcined clay, pyropylite, bentonite, zeolite, talc, synthetic aluminum silicates, synthetic calcium silicates, diatomateous earth, anhydrous silicic acid powder, aluminum hydroxide, barite, barium sulfate, gypsum, calcium sulfate, and organic particles.

9. The transfer film of claim 4, wherein the particulate filler comprises alumina or silica.

10. The transfer film of claim 4, wherein the particulate filler comprises alumina.

11. The transfer film of claim 4, wherein the particulate filler comprises particles having an average dimension between 0.01 μm and 15.0 μm.

12. The transfer film of claim 1, wherein the transferable skin layer comprises 5% to 100% by weight hydrophilic polymer, 0% to 20% by weight hydrophobic polymer, and 0% to 80% particulate filler.

13. The transfer film of claim 12, wherein the hydrophilic polymer is selected from the group consisting of poly(vinyl alcohol) (PVA), poly(vinyl pyrrolidone) (PVP), poly (2-ethyl-2-oxazoline), modified starch, hydroxyalkyl cellulose, carboxyalkyl cellulose, styrene butadiene rubber (SBR) latex, nitrile butadiene rubber (NBR) latex, vinyl pyrrolidone/vinyl acetate copolymer, vinyl acetate/acrylic copolymers, acrylic acid polymers, acrylic acid copolymers, acrylamide polymers, acrylamide copolymers, styrene copolymers, alkylene oxide polymers and copolymers, gelatins, modified gelatins, and polysaccharides.

14. The transfer film of claim 13, wherein styrene copolymers comprise styrene copolymers of allyl alcohol, acrylic acid, malaeic acid, esters or anhydrides.

15. The transfer film of claim 12, wherein the hydrophobic polymer is selected from the group consisting of cellulosic polymers, vinyl polymers, polyvinyl chloride, polyvinyl acetate, vinyl chloride vinyl acetate copolymers, ethylene vinyl acetate copolymer, acrylic polymers, polyurethane, polyester, and polyamide, polyolefin, polyimide, and polycarbonate.

16. The transfer film of claim 12, wherein the particulate filler is selected from the group consisting of silica, silica gel, alumina, alumina gel, boehmite, pseudoboehmite, clay, calcium carbonate, chalk, magnesium carbonate, kaolin, calcined clay, pyropylite, bentonite, zeolite, talc, synthetic aluminum silicates, synthetic calcium silicates, diatomaceous earth, anhydrous silicic acid powder, aluminum hydroxide, barite, barium sulfate, gypsum, calcium sulfate, and organic particles.

17. The transfer film of claim 12, wherein the particulate filler comprises silica or alumina.

18. The transfer film of claim 12, wherein the particulate filler comprises silica.

19. A transfer film comprising:

a carrier substrate;

a transferable skin layer; a solvent absorbing layer, wherein the solvent absorbing layer is configured to absorb solvent from the ink upon printing of an image on the transferable skin layer, and wherein the solvent absorbing layer is adhered so the carrier substrate; and an intermediate layer, wherein the intermediate layer is located between the solvent absorbing layer and the transferable skin layer; wherein the solvent absorbing layer and the transferable skin layer are separate and distinct layers.

20. The transfer film of claim 19, wherein the carrier substrate comprises a plastic film.

21. The transfer film of claim 19, wherein the carrier substrate has a thickness between 10 $\mu$m to 250 $\mu$m.

22. The transfer film of claim 19, wherein the carrier substrate has a thickness between 10 $\mu$m to 100 $\mu$m.

23. The transfer film of claim 19, wherein the carrier substrate comprises a polymer selected from the group consisting of polyester, polypropylene, poly (vinyl fluoride), polyethylene, polyurethane, poly (ethylene terephthalate) (PET), poly (ethylene naphthanate) (PEN), polyamide, cellulose acetate, ethylene vinyl acetate copolymers, polyolefin, polyimide, and polycarbonate.

24. The transfer film of claim 19, wherein the carrier substrate comprises poly (ethylene terephthalate).

25. The transfer film of claim 19, wherein the solvent absorbing layer comprises a single layer.

26. The transfer film of claim 19, wherein the solvent absorbing layer comprises more than one layer.

27. The transfer film of claim 19, wherein the solvent absorbing layer has a thickness between 5 $\mu$m and 50 $\mu$m.

28. The transfer film of claim 19, wherein the solvent absorbing layer comprises 5% to 100% by weight hydrophilic polymer, 0% to 30% by weight hydrophobic polymer, and 0% to 60% by weight particulate filler.

29. The transfer film of claim 28, wherein the hydrophilic polymer is selected from the group consisting of poly(vinyl alcohol) (PVA), poly(vinyl pyrrolidone) (PVP), poly (2-ethyl-2-oxazoline), modified starch, hydroxyalkyl cellulose, carboxyalkyl cellulose, styrene butadiene rubber (SBR) latex, nitrile butadiene rubber (NBR) latex, vinyl pyrrolidone/vinyl acetate copolymer, vinyl acetate/acrylic copolymers, acrylic acid polymers, acrylic acid copolymers, acrylamide polymers, acrylamide copolymers, styrene copolymers, alkylene oxide polymers and copolymers, gelatins, modified gelatins, and polysaccharides.

30. The transfer film of claim 29, wherein styrene copolymers comprise styrene copolymers of allyl alcohol, acrylic acid, malaeic acid, esters or anhydrides.

31. The transfer film of claim 28, wherein the hydrophobic polymer is selected from the group consisting of cellulosic polymers, vinyl polymers, polyvinyl chloride, polyvinyl acetate, vinyl chloride vinyl acetate copolymers, ethylene vinyl acetate copolymer, acrylic polymers, polyurethane, polyester, and polyamide, polyolefin, polyimide, polycarbonate.

32. The transfer film of claim 28, wherein the particulate filler is selected from the group consisting of silica, silica gel, alumina, alumina gel, boehmite, pseudoboehmite, clay, calcium carbonate, chalk, magnesium carbonate, kaolin, calcined clay, pyropylite, bentonite, zeolite, talc, synthetic aluminum silicates, synthetic calcium silicates, diatomaceous earth, anhydrous silicic acid powder, aluminum hydroxide, barite, barium sulfate, gypsum, calcium sulfate, and organic particles.

33. The transfer film of claim 28, wherein the particulate filler comprises alumina or silica.

34. The transfer film of claim 28, wherein the particulate filler comprises alumina.

35. The transfer film of claim 28, wherein the particulate filler comprises particles having an average dimension between 0.01 $\mu$m and 15.0 $\mu$m.

36. The transfer film of claim 19, wherein the transferable skin layer comprises 5% to 100% by weight hydrophilic polymer, 0% to 20% by weight hydrophobic polymer, and 0% to 80% particulate filler.

37. The transfer film of claim 36, wherein the hydrophilic polymer is selected from the group consisting of poly(vinyl alcohol) (PVA), poly(vinyl pyrrolidone) (PVP), poly (2-ethyl-2-oxazoline), modified starch, hydroxyalkyl cellulose, carboxyalkyl cellulose, styrene butadiene rubber (SBR) latex, nitrile butadiene rubber (NBR) latex, vinyl pyrrolidone/vinyl acetate copolymer, vinyl acetate/acrylic copolymers, acrylic acid polymers, acrylic acid copolymers, acrylamide polymers, acrylamide copolymers, styrene copolymers, alkylene oxide polymers and copolymers, gelatins, modified gelatins, and polysaccharides.

38. The transfer film of claim 37, wherein styrene copolymers comprise styrene copolymers of allyl alcohol, acrylic acid, malaeic acid, esters or anhydrides.

39. The transfer film of claim 36, wherein the hydrophobic polymer is selected from the group consisting of cellulosic polymers, vinyl polymers, polyvinyl chloride, polyvinyl acetate, vinyl chloride vinyl acetate copolymers, ethylene vinyl acetate copolymer, acrylic polymers, polyurethane, polyester, polyamide, polyolefin, polyimide, and polycarbonate.

40. The transfer film of claim 36, wherein the particulate filler is selected from the group consisting of silica, silica gel, alumina, alumina gel, boehmite, pseudoboehmite, clay, calcium carbonate, chalk, magnesium carbonate, kaolin, calcined clay, pyropylite, bentonite, zeolite, talc, synthetic aluminum silicates, synthetic calcium silicates, diatomaceous earth, anhydrous silicic acid powder, aluminum hydroxide, barite, barium sulfate, gypsum, calcium sulfate, and organic particles.

41. The transfer film of claim 36, wherein the particulate filler comprises silica or alumina.

42. The transfer film of claim 36, wherein the particulate filler comprises silica.

43. The transfer film of claim 19, wherein the transferable skin layer has a thickness between 0.01 $\mu$m and 12 $\mu$m.

44. The transfer film of claim 19, wherein the transferable skin layer has a thickness between 0.1 $\mu$m to 5.0 $\mu$m.

45. The transfer film of claim 19, wherein the intermediate layer comprises 1% to 100% by weight hydrophobic polymer; 0% to 95% by weight hydrophilic polymer and 0% to 80% by weight particulate filler.

46. The transfer film of claim 45, wherein the hydrophobic polymer is selected from the group consisting of cellulosic polymers, vinyl polymers, polyvinyl chloride, polyvinyl acetate, vinyl chloride vinyl acetate copolymers, ethylene vinyl acetate copolymer, acrylic polymers, polyurethane, polyester, polyamide, polyolefin, polyimide, and polycarbonate.

47. The transfer film of claim 45, wherein the hydrophilic polymer is selected from the group consisting of poly(vinyl alcohol) (PVA), poly(vinyl pyrrolidone) (PVP), poly (2-ethyl-2-oxazoline), modified starch, hydroxyalkyl cellulose, carboxyalkyl cellulose, styrene butadiene rubber (SBR) latex, nitrile butadiene rubber (NBR) latex, vinyl pyrrolidone/vinyl acetate copolymer, vinyl acetate/acrylic copolymers, acrylic acid polymers, acrylic acid copolymers, acrylamide polymers, acrylamide copolymers, styrene copolymers, alkylene oxide polymers and copolymers, gelatins, modified gelatins, and polysaccharides.

48. The transfer film of claim 47, wherein styrene copolymers comprise styrene copolymers of allyl alcohol, acrylic acid, malaeic acid, esters or anhydrides.

49. The transfer film of claim 45, wherein the particulate filler is selected from the group consisting of silica, silica gel, alumina, alumina gel, boehmite, pseudoboehmite, clay, calcium carbonate, chalk, magnesium carbonate, kaolin, calcined clay, pyropylite, bentonite, zeolite, talc, synthetic aluminum silicates, synthetic calcium silicates, diatomaceous earth, anhydrous silicic acid powder, aluminum hydroxide, barite, barium sulfate, gypsum, calcium sulfate, and organic particles such as hydrophobic polymeric beads.

50. The transfer film of claim 45, wherein the particulate filler comprises silica or alumina.

51. The transfer film of claim 45, wherein the particulate filler comprises silica.

52. The transfer film of claim 45, wherein the particulate filler comprises particles having a average dimension between 0.01 $\mu$m to 15.0 $\mu$m.

53. The transfer film of claim 45, wherein the particulate filler comprises particles having a average dimension between 0.1 $\mu$m to 10.0 $\mu$m.

* * * * *